US 8,244,207 B2

(12) United States Patent
Chang

(10) Patent No.: US 8,244,207 B2
(45) Date of Patent: Aug. 14, 2012

(54) SYSTEM AND METHOD FOR PAYMENT USING A MOBILE ELECTRONIC DEVICE

(75) Inventor: Chi-Hao Chang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 494 days.

(21) Appl. No.: 12/493,137

(22) Filed: Jun. 26, 2009

(65) Prior Publication Data

US 2010/0009663 A1 Jan. 14, 2010

(30) Foreign Application Priority Data

Jul. 11, 2008 (CN) .......................... 2008 1 0302716

(51) Int. Cl.
*H04M 11/00* (2006.01)
(52) U.S. Cl. .................. 455/406; 235/380; 235/482.01; 235/462.46; 705/40
(58) Field of Classification Search .................. 455/406; 235/380, 462.01, 462.46, 40, 39; 705/40
See application file for complete search history.

(56) References Cited

U.S. PATENT DOCUMENTS

| 7,292,996 B2* | 11/2007 | Nobrega et al. ................. 705/39 |
| 2007/0027803 A1* | 2/2007 | Brandes et al. ................. 705/39 |
| 2008/0210754 A1* | 9/2008 | Lovett .......................... 235/380 |
| 2010/0223187 A1* | 9/2010 | Fujita et al. .................... 705/75 |

FOREIGN PATENT DOCUMENTS

CN 1581186 A 2/2005

* cited by examiner

*Primary Examiner* — Kamran Afshar
*Assistant Examiner* — Yousef Rod
(74) *Attorney, Agent, or Firm* — Altis Law Group, Inc.

(57) ABSTRACT

A system and method of payment using a mobile electronic device establishes a wireless communication connection between a credit card terminal and a credit card system, and logging in the credit card system. The system and method further receives a two-dimensional barcode from the credit card system, wherein the two-dimensional barcode comprising the authorization information, and sends the two-dimensional barcode to the credit card terminal to verify validity of the authorization information. Furthermore, the system and method receives a verification result from the credit card terminal, and prompts a user for payment on a display device of the mobile electronic device, in response to a determination that the authorization information is valid.

15 Claims, 5 Drawing Sheets

SYSTEM AND METHOD FOR PAYMENT USING A MOBILE ELECTRONIC DEVICE

BACKGROUND

1. Technical Field

Embodiments of the present disclosure are related to electronic device management systems and methods, and particularly to a system and method for payment using a mobile electronic device.

2. Description of Related Art

A credit card is part of a system of payments named after the small plastic card issued to consumers. It is a card entitling its cardholder to buy goods and services based on the cardholder's promise to pay for these goods and services. The issuer of the credit card grants a line of credit to the cardholder from which the cardholder can borrow money for payment to a merchant. However, if a cardholder may forget where he/she left the credit card is deposited, then the cardholder cannot use the credit card for payment.

Therefore, there is a need for a system and method to overcome the aforementioned problem.

DETAILED DESCRIPTION

All of the processes described below may be embodied in, and fully automated via, function modules executed by one or more general purpose processors of a mobile electronic device. Some or all of the methods may alternatively be embodied in specialized hardware. The function modules may be stored in any type of computer-readable medium or other computer storage device.

Figure 1:
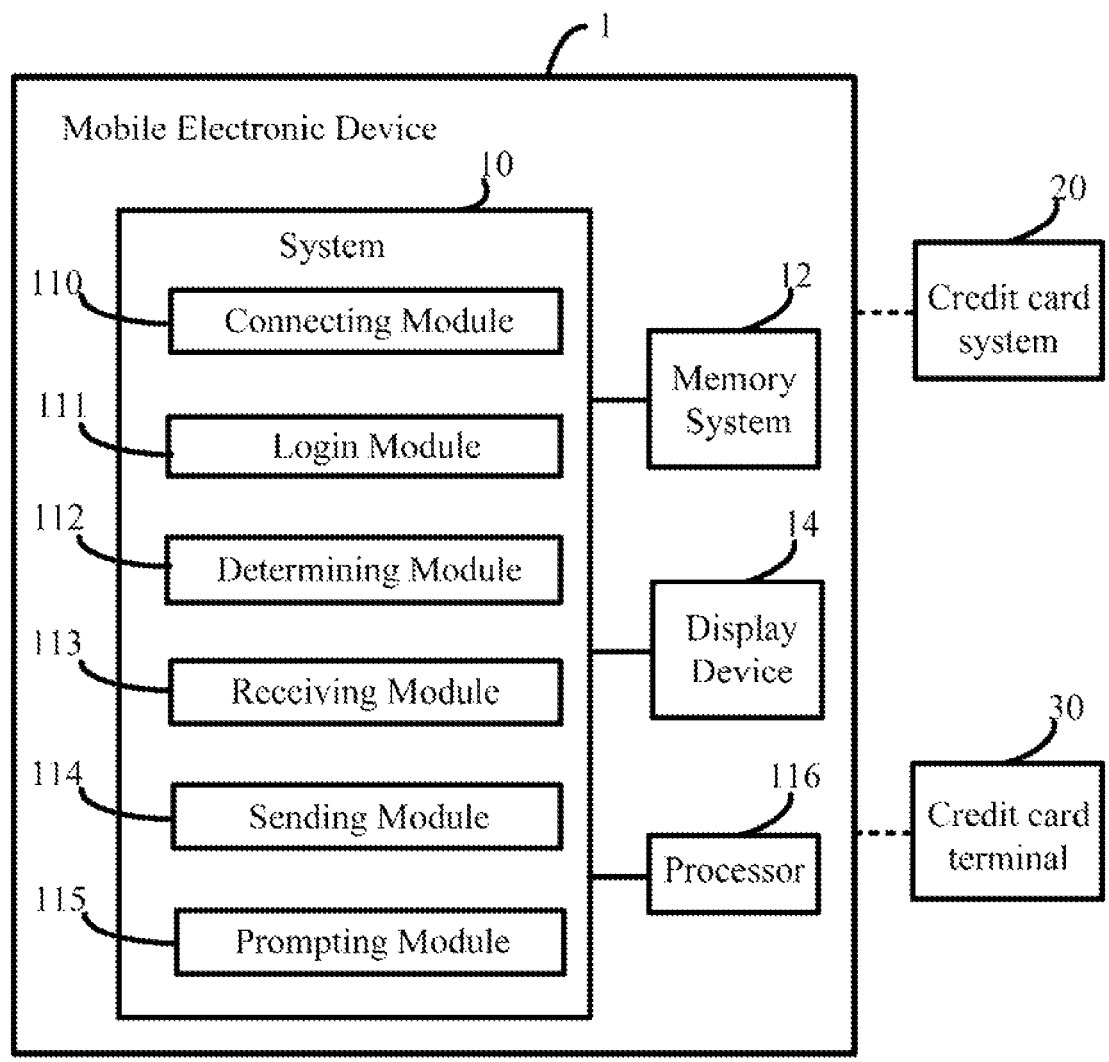
FIG. 1 is a block diagram of one embodiment of a system for payment using a mobile electronic device.

FIG. 1 is a block diagram of one embodiment of a mobile electronic device 1 comprising a system 10. The system 10 may be used for payment using the mobile electronic device 1. In one embodiment, the mobile electronic device 1 includes a memory system 12 and a display device 14. The mobile electronic device 1 is used to establish a communication connection with a credit card terminal 30 and a credit card system 20 corresponding to a credit card using a wireless connection, such as a BLUETOOTH connection, a local area network, a global system for mobile communication (GSM) network, or a code division multiple access (CDMA) for mobile communication network.

The memory system 12 may be an internal memory system card or an external memory system card. The external memory system card may include a smart media card (SMC), a secure digital card (SDC), a compact flash card (CFC), a multi media card (MMC), a memory system stick (MS), an extreme digital card (XDC), and a trans flash card (TFC). Depending on the embodiment, the mobile electronic device 1 may be a mobile phone, or a personal digital assistant (PDA), among other portable electronic devices with a communication function.

In one embodiment, the system 10 includes a connecting module 110, a login module 111, a determining module 112, a receiving module 113, a sending module 114, and a prompting module 115. One or more computerized codes of the modules 110-115 are stored in the memory system 12. One or more general purpose or specialized processors, such as a processor 116 executes the computerized codes of the modules 110-115 to provide one or more operations of the system 10.

The connecting module 110 is operable to establish a wireless communication connection between the credit card terminal 30 and the credit card system 20. As mentioned above, the connecting module 110 establishes the communication connection with the credit card terminal 30 and the credit card system 20 wirelessly.

Figure 3:
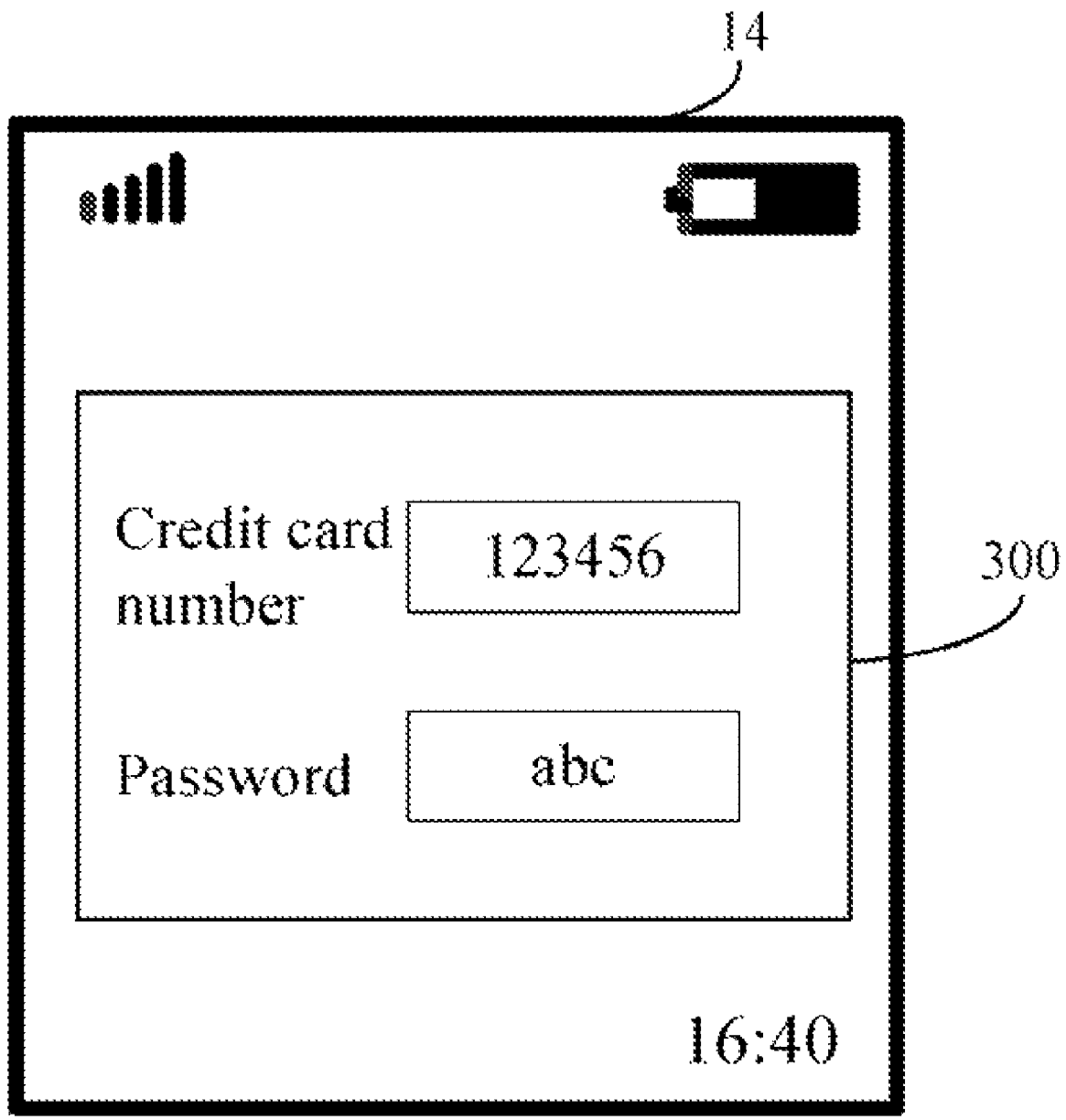
FIG. 3 illustrates one embodiment of a login interface displayed on a display device.

The login module 111 is operable to receive a credit card number and a password input by a user of the credit card, so as to log into the credit card system 20. In one embodiment, the user may press one or more buttons on the mobile electronic device 1 to input credit the card number and the password. In another embodiment, the mobile electronic device 1 may comprise a touch panel to receive user input. As shown in FIG. 3, the user inputs the credit card number and the password in a login interface 300 to log into the credit card system 20.

The determining module 112 is operable to determine if the credit card number and the password are correct.

Figure 4:
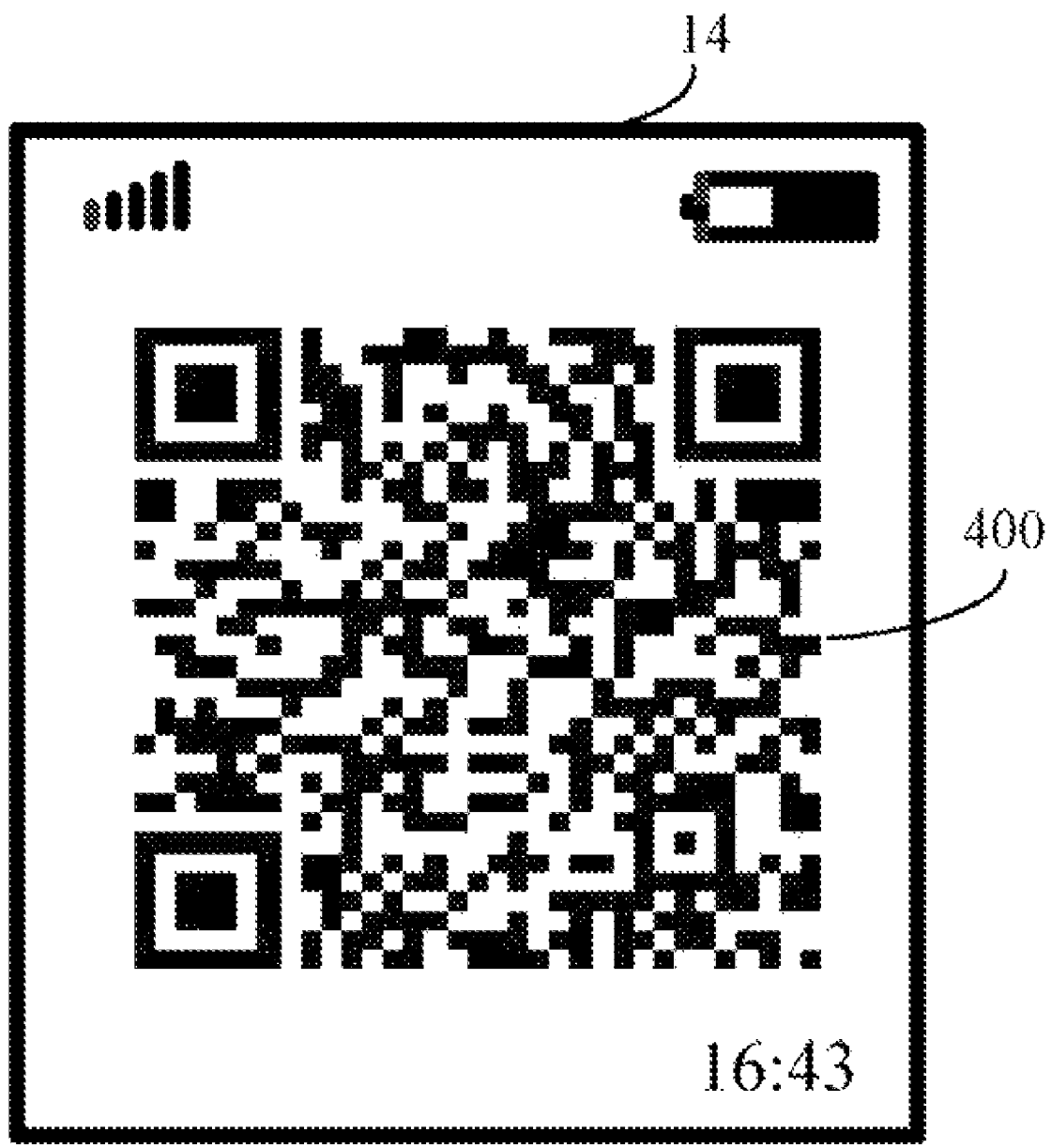
FIG. 4 illustrates one embodiment of a two-dimensional barcode displayed on the display device.

The receiving module 113 is operable to receive a two-dimensional barcode 400 (refer to FIG. 4) generated by the credit card system 20, and to display the two-dimensional barcode 400 on the display device 14 of the mobile electronic device 1, in response to a determination that the credit card number and the password are correct. The two-dimensional barcode 400 comprises authorization information and is displayed on the display device 14 of the mobile electronic device 1. The authorization information includes a name of the credit cardholder, a credit card number, an issued date of the credit card, an expired date of the credit card, and a timestamp of the authorization information.

The sending module 114 is operable to send the two-dimensional barcode 400 to the credit card terminal 30 to verify validity of the authorization information. In one embodiment, the credit card terminal 30 decodes the two-dimensional barcode 400 to verify validity of the authorization information using a physical barcode reader of the credit card terminal 30, such as a laser scanner, for example. The laser scanner scans the two-dimensional barcode 400 to verify validity of the authorization information. In one embodiment, the sending module 114 sends authorization information of the two-dimensional barcode 400 to the credit card terminal 30 wirelessly (e.g., over a BLUETOOTH connection, a local area network, a GSM network, or a CDMA for mobile communication network.)

The receiving module 113 is further operable to receive a verification result from the credit card terminal 30.

The determining module 112 is further operable to determine if the authorization information is valid according to the verification result. In one embodiment, for example, if the credit card is out of the expired date, or the timestamp of the authorization information is overdue, then the determining module 112 determines that the authorization information is invalid.

The prompting module 115 is operable to display a prompt for prompting the user for payment on the display device 14 of the mobile electronic device 1, in response to a determination that the authorization information is valid. In one embodiment, the prompting module 115 pops up a dialog box on the display device 14 of the mobile electronic device 1 to prompt the user to input an amount to be paid.

Figure 2:
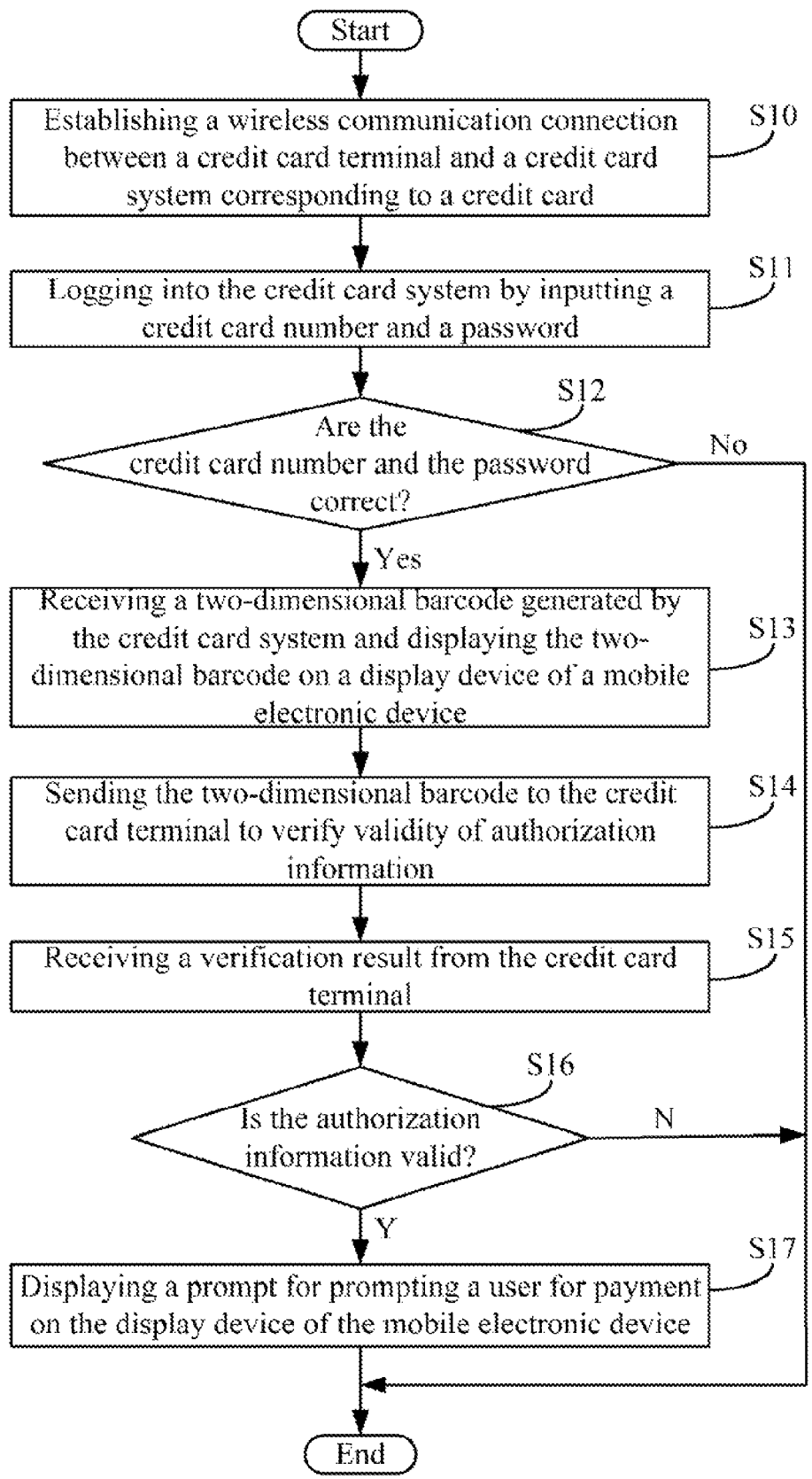
FIG. 2 is a flowchart of one embodiment of a method for payment using a mobile electronic device.

FIG. 2 is a flowchart of one embodiment of a method for payment using the mobile electronic device 1. Depending on the embodiment, additional blocks may be added, while others deleted, and the blocks may also be executed in a different order than described.

In block S10, the connecting module 110 establishes a wireless communication connection between the credit card terminal 30 and the credit card system 20. As mentioned above, the connecting module 110 establishes the communication connection with the credit card terminal 30 and the credit card system 20 wirelessly (e.g., over a BLUETOOTH connection, a local area network, a GSM network, or a CDMA for mobile communication network.)

In block S11, the login module 111 receives a credit card number and a password inputted by a user of the credit card, to log into the credit card system 20. In one embodiment, assuming that the credit card number is "123456" and the password is "abc," if the user inputs the credit card number "123456" and the password "abc," then the login module 111 logs into the credit card system 20. As shown in FIG. 3, the user inputs the credit card number "123456" and the password "abc" in a login interface 300 to log into the credit card system 20.

In block S12, the determining module 112 determines if the credit card number and the password are correct. In one embodiment, if the user inputs the credit card number "234567" or the password "bc," then the procedure ends. Otherwise, if the user inputs the credit card number "123456" or the password "abc," the procedure goes to block S13.

In block S13, the receiving module 113 receives a two-dimensional barcode 400 generated by the credit card system 20 and displays the two-dimensional barcode 400 on the display device 14, in response to a determination that the credit card number and the password are correct. As mentioned above, the two-dimensional barcode 400 contains the authorization information and is displayed on the display device 14 of the mobile electronic device 1.

In block S14, the sending module 114 sends the two-dimensional barcode 400 to the credit card terminal 30 to verify validity of the authorization information. As mentioned above, the credit card terminal 30 decodes the two-dimensional barcode 400 to verify validity of the authorization information using a physical barcode reader of the credit card terminal 30, such as a laser scanner, for example.

In block S15, the receiving module 113 receives a verification result from the credit card terminal 30.

In block S16, the determining module 112 determines if the authorization information is valid according to the verification result. In one embodiment, if the authorization information is invalid, then the procedure ends. For example, if the credit card is out of the expired date, or the timestamp of the authorization information is overdue, then the procedure ends. Otherwise, if the authorization information is valid, then the procedure goes to block S17.

Figure 5:
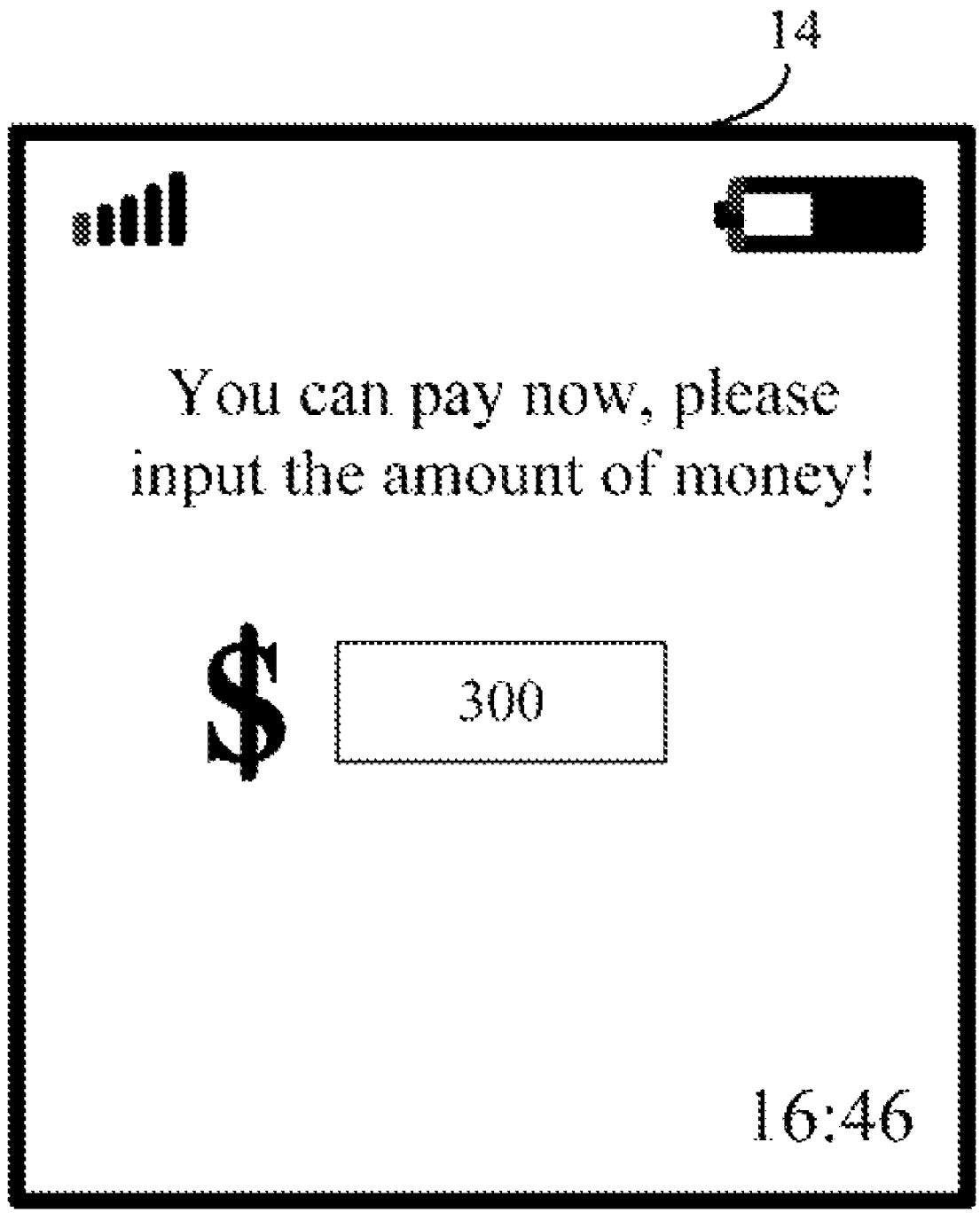
FIG. 5 illustrates one embodiment of a prompt displayed on the display device.

In block S17, the prompting module 115 displays a prompt for prompting the user for payment on the display device 14 of the mobile electronic device 1, in response to a determination that the authorization information is valid. As mentioned above, the prompting module 115 pops up a dialog box on the display device 14 of the mobile electronic device 1 to prompt the user to input an amount to be paid. For example, as shown in FIG. 5, the dialog box may contain, but is not limited to, a message saying "You can pay now, please input the amount of money!"

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A payment system using a mobile electronic device, the mobile electronic device comprising a memory system storing a plurality of programs and a processor that executes one or more operations for the plurality of programs, the programs comprising:
   a connecting module operable to establish a wireless communication connection between a credit card terminal and a credit card system corresponding to a credit card;
   a login module operable to log into the credit card system using an inputted credit card number and password;
   a determining module operable to determine if the credit card number and the password are correct;
   a receiving module operable to receive a two-dimensional barcode generated by the credit card system, and to display the two-dimensional barcode on a display device of the mobile electronic device, in response to a determination that the credit card number and the password are correct, wherein the two-dimensional barcode comprises authorization information;
   a sending module operable to send the two-dimensional barcode to the credit card terminal to verify validity of the authorization information;
   the receiving module further operable to receive a verification result from the credit card terminal;
   the determining module further operable to determine if the authorization information is valid according to the verification result; and
   a prompting module operable to display a prompt for prompting a user for payment on the display device of the mobile electronic device, in response to a determination that the authorization information is valid.

2. The system of claim 1, wherein the authorization information comprises a name of the credit cardholder, a credit card number, an issued date of the credit card, an expired date of the credit card, and a timestamp of the authorization information.

3. The system of claim 1, wherein the credit card terminal decodes the two-dimensional barcode to verify validity of the authorization information using a physical barcode reader of the credit card terminal.

4. The system of claim 1, wherein the mobile electronic device is a mobile phone or a personal digital assistant (PDA).

5. The system of claim 1, wherein the memory system is selected from the group consisting of a smart media card (SMC), a secure digital card (SDC), a compact flash card (CFC), a multi media card (MMC), a memory system stick (MS), an extreme digital card (XDC), and a trans flash card (TFC).

6. A computer-implemented method of payment using a mobile electronic device, the method comprising:
   establishing a wireless communication connection between a credit card terminal and a credit card system corresponding to a credit card;
   logging into the credit card system using an inputted credit card number and password;
   receiving a two-dimensional barcode generated by the credit card system and displaying the two-dimensional barcode on a display device of the mobile electronic device, in response to a determination that the credit card number and the password are correct, wherein the two-dimensional barcode comprises authorization information;

sending the two-dimensional barcode to the credit card terminal to verify validity of the authorization information;

receiving a verification result from the credit card terminal; and displaying a prompt for prompting a user for payment on the display device of the mobile electronic device, in response to a determination that the authorization information is valid.

7. The method of claim 6, wherein the authorization information comprises a name of the credit cardholder, a credit card number, an issued date of the credit card, an expired date of the credit card, and a timestamp of the authorization information.

8. The method of claim 6, wherein the credit card terminal decodes the two-dimensional barcode to verify validity of the authorization information using a physical barcode reader of the credit card terminal.

9. The method of claim 6, wherein the mobile electronic device is a mobile phone or a personal digital assistant (PDA).

10. The method of claim 6, wherein the memory system is selected from the group consisting of a smart media card (SMC), a secure digital card (SDC), a compact flash card (CFC), a multi media card (MMC), a memory system stick (MS), an extreme digital card (XDC), and a trans flash card (TFC).

11. A storage medium having stored thereon instructions that, when executed by a mobile electronic device, causes the mobile electronic device to perform a method of payment using a mobile electronic device, the method comprising:

establishing a wireless communication connection between a credit card terminal and a credit card system corresponding to a credit card;

logging into the credit card system using an inputted credit card number and password;

receiving a two-dimensional barcode generated by the credit card system and displaying the two-dimensional barcode on a display device of the mobile electronic device, in response to a determination that the credit card number and the password are correct, wherein the two-dimensional barcode comprises authorization information;

sending the two-dimensional barcode to the credit card terminal to verify validity of the authorization information;

receiving a verification result from the credit card terminal; and displaying a prompt for prompting a user for payment on the display device of the mobile electronic device, in response to a determination that the authorization information is valid.

12. The medium of claim 11, wherein the authorization information comprises a name of the credit cardholder, a credit card number, an issued date of the credit card, an expired date of the credit card, and a timestamp of the authorization information.

13. The medium of claim 11, wherein the credit card terminal decodes the two-dimensional barcode to verify validity of the authorization information using a physical barcode reader of the credit card terminal.

14. The medium of claim 11, wherein the mobile electronic device is a mobile phone or a personal digital assistant (PDA).

15. The medium of claim 11, wherein the memory system is selected from the group consisting of a smart media card (SMC), a secure digital card (SDC), a compact flash card (CFC), a multi media card (MMC), a memory system stick (MS), an extreme digital card (XDC), and a trans flash card (TFC).

* * * * *